3,755,432
NEW PROCESS FOR THE PREPARATION OF
1-INDANCARBOXYLIC ACIDS
Terrence W. Doyle, Candiac, Leeson R. Morris, Hemmingford, and Marcel Menard, Candiac, Quebec, Canada, assignors to Bristol-Myers Company, New York, N.Y.
No Drawing. Continuation-in-part of application Ser. No. 201,566, Nov. 23, 1971. This application July 11, 1972, Ser. No. 270,771
Int. Cl. C07c 63/00
U.S. Cl. 260—515 R    7 Claims

ABSTRACT OF THE DISCLOSURE

Levorotatory 5-cyclohexyl-1-indancarboxylic acid is a useful anti-inflammatory agent in the treatment of inflammatory diseases in animals, including man. As such, a new and more efficient process has been discovered for the preparation of large quantities of the racemic mixture of the compound, (±)-5-cyclohexyl-1-indancarboxylic acid.

CROSS-REFERENCE TO RELATED APPLICATION

This application is a continuation-in-part of copending application Ser. No. 201,566, filed Nov. 23, 1971, now abandoned.

BACKGROUND OF THE INVENTION (1) Field of the invention

The process of the present invention is a new and more efficient procedure for the preparation of large quantities of (±)-5-cyclohexyl-1-indancarboxylic acid.

(2) Description of the prior art

The process of the present invention is new and novel and produces yields several fold those obtained by the process described in U.S. Pat. No. 3,565,943.

The art we are acquainted with that is most closely related to that of the process of the instant invention can be found in the following references:

(A) P. F. Juby, R. A. Partyka and T. W. Hudyma, U.S. Pat. No. 3,565,943, report the preparation of (±)-5-cyclohexyl-1-indancarboxylic acid.

(B) W. A. White and H. Weingarten, J. Org. Chem. 32, 213 (1967) report the preparation of enamines from ketones via the use of titanium tetrachloride.

(C) A. Lukasiewicz and J. Lesinka, Tetrahedron, 21, 3247 (1965) and 24, 7 (1968) report the conversion of enamines to acids.

SUMMARY OF THE INVENTION

This invention is a new and novel process for the preparation of the compound having the formula

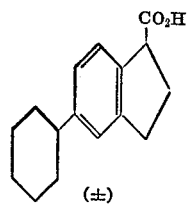

I which process comprises the consecutive steps of (A) treating a mixture of morpholine and a compound having the formula

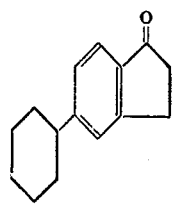

II with a strong acid with the aid of heat, azeotropically removing the water so generated, or with titanium tetrachloride at room temperature to produce the compound having the formula

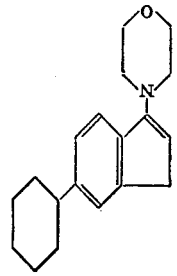

III;

(B) acylating Compound III with trichloroacetic acid to produce a compound having the formula

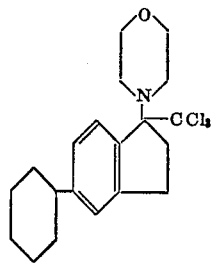

IV (C) refluxing Compound IV in a (lower)alkanol to produce a mixture of compounds having the formulas

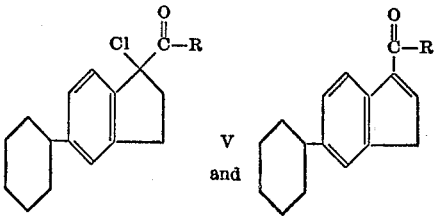

V and in which R is (lower)alkoxy or

(D) hydrogenating Mixture V to produce a mixture of compounds having the formula

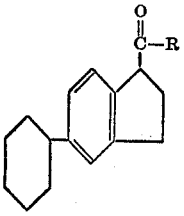

V in which R is (lower)alkoxy or

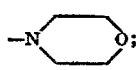

and (E) *hydrolyzing* Mixture VI.

DISCLOSURE OF THE INVENTION

This invention relates to a new and novel and more efficient process for the preparation of nonsteroidal antiinflammatory agents having the name (±)-5-cyclohexyl-1-indancarboxylic acid, and more particularly the compound (—)-5-cyclohexyl-1-indancarboxylic acid which is the more potent isomer (U.S. Pat. No. 3,565,943).

The compounds produced by the process are characterized by the formula

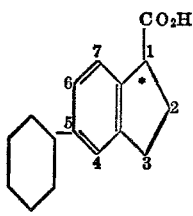

The carbon to which the carboxyl group is attached is an asymmetric carbon atom (*) such that the compound exists in two isomeric forms; dextro- and levorotatory isomers. Of these two isomers, the levorotatory isomer is the most potent isomer as an anti-inflammatory agent. However, the dextrorotatory isomer is also of importance inasmuch as it can be racemized to produce the desired levorotatory isomer.

It was an object of the instant invention to provide a new, novel and more efficient process for the preparation of these compounds, said compounds being useful in the treatment of a variety of inflammatory diseases such as rheumatoid arthritis, rheumatoid spondylitis, osteoarthritis, gout and other similar afflictions.

The process of the instant invention can be illustrated by the following diagram.

Step A

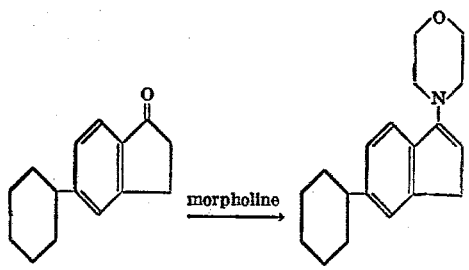

Step B

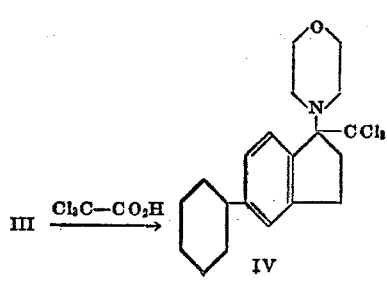

Step C

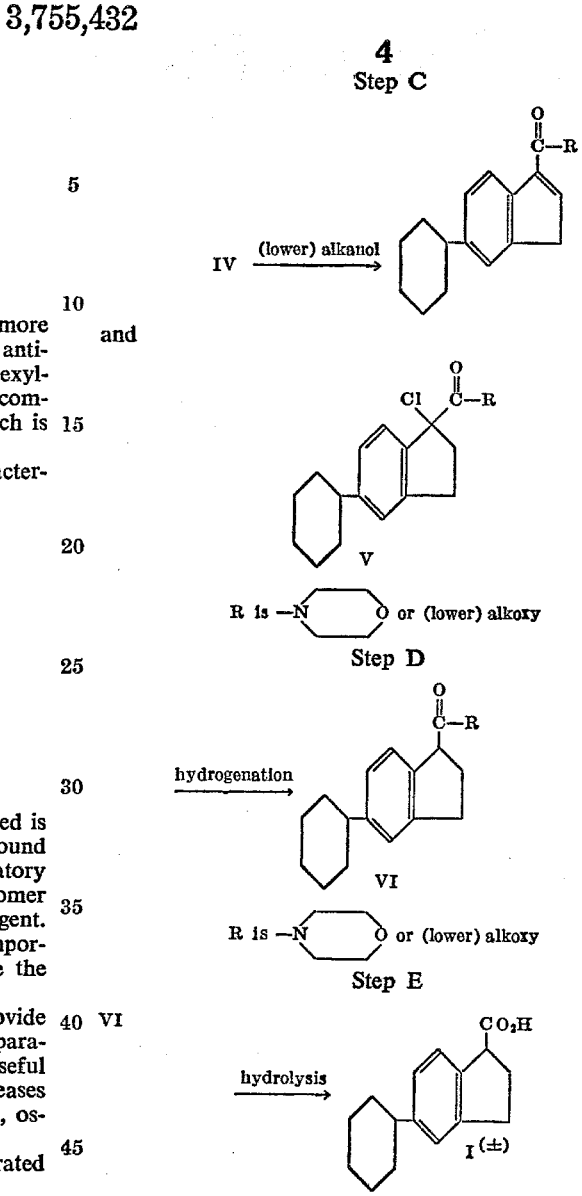

The objectives of the present invention have been achieved by the provision of the process which comprises the consecutive steps of (A) *treating* one mole of the compound having the formula

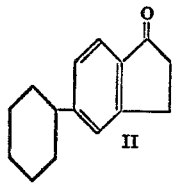

with at least one mole of a secondary amine, preferably selected from the group comprising morpholine, pyrrolidine, piperidine, N-methylpiperazine and the like, but preferably morpholine, preferably in a ratio of one mole of Compound II to 1.5 to 4 moles of amine, and more preferably two moles, in an organic solvent capable of forming a water azeotrope, but preferably toluene, xylene or benzene, and most preferably toluene, at about reflux temperatures, in the presence of a catalytic amount of a strong high boiling acid, preferably benzenesulfonic, p-toluenesulfonic, concentrated sulfuric acid, concentrated phosphoric acid and the like but preferably p-toluenesulfonic acid; or alternatively treating one mole of Compound II with at least one mole of morpholine, but preferably 1.5 to 6 moles, and most preferably about four moles of morpholine, in the presence of at least 0.5 mole of titanium tetrachloride, but preferably 0.5 to 0.7 mole and most preferably 0.6 mole of titanium tetrachloride, in an inert organic solvent, preferably selected from the group comprising benzene, toluene, xylene and the like, and most preferably benzene, at about room temperature to produce the compound having the formula

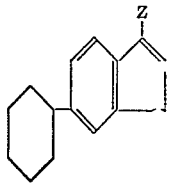

III in which Z is a radical of the formula

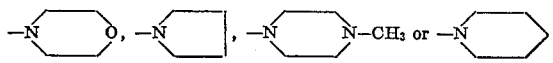

(B) acylating one mole of Compound III with at least one mole of trichloroacetic acid, but preferably 1.0 to 1.2 moles, and most preferably about 1.0 mole of trichloroacetic acid, in an inert organic solvent, preferably benzene, toluene or xylene, and most preferably benzene, at a temperature of 30–50° C., to produce the compound having the formula

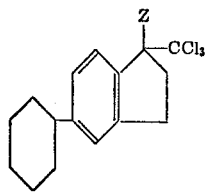

IV in which Z is as defined above;

(C) refluxing Compound IV in a (lower)alkanol, preferably methanol, propanol or ethanol, but most preferably methanol, to produce a mixture of compounds having the formula

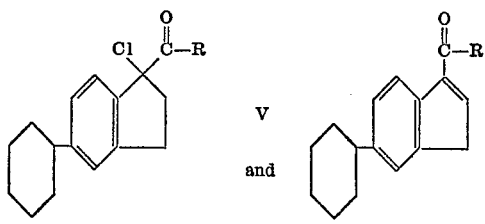

V and in which R is (lower)alkoxy or —Z;

(D) *hydrogenating* one mole of Mixture V with hydrogen in the presence of a metal catalyst, preferably selected from the group comprising palladium, platinum, rhodium, nickel, Raney nickel, ruthenium, but most preferably Raney nickel, at a pressure of about 40 to about 200 p.s.i. until up to a maximum of one mole of hydrogen per mole of Mixture V is absorbed to produce a mixture of compounds having the formula

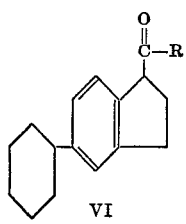

VI in which R is (lower)alkoxy or —Z; and (E) *hydrolyzing* Mixture VI with acid or base in the presence of water, but preferably with hydrochloric acid in glacial acetic acid, at about reflux temperature to produce Compound I.

The resolution of (±) 5-cyclohexyl-1-indancarboxylic acid can be accomplished according to the following procedure:

(A) (±)-5-cyclohexyl-1-indancarboxylic acid: A solution of (±)-5-cyclohexyl-1-indancarboxylic acid (15.0 grams, 0.0614 mole) and cinchonidine (9.05 grams, 0.037 mole) in absolute ethanol (700 ml.) was boiled down to a volume of about 300 ml. The mixture was allowed to cool slowly and was left for twenty hours at 25° C. The colorless crystals were collected and washed with cold ethanol to give the cinchonidine salt of (+)-5-cyclohexyl-1-indancarboxylic acid (13.0 grams), M.P. 212–212.5° C. Additional cinchonidine (1.0 gram, 0.0034 mole) was added to the mother liquors and their volume reduced to about 165 ml. by boiling. The hot solution was seeded with the salt of the (+) acid and stored at 5° C. for sixty-five hours, when an additional crop (2.4 grams) of the cinchonidine salt of the (+) acid, M.P. 211–215° C. was obtained. The mother liquors were retained for isolation of the (—) isomer.

The salt with M.P. 212–215° C. was recrystallized from ethanol to give colorless crystals (11.8 grams), M.P. 217.5–219° C. The product was partitioned between ether (500 ml.) and 10% aqueous hydrochloric acid (250 ml.) and water saturated with sodium chloride (250 ml.). The etheral solution was dried ($Na_2SO_4$), filtered, and the filtrate reduced to dryness to give (+)-5-cyclohexyl-1-indancarboxylic acid (5.5 grams), M.P. 108–110° C. Two recrystallizations from petroleum ether (B.P. 39–50° C.), gave colorless needles, M.P. 108–109.5° C., $[\alpha]_D^{25}+9.60°$ (ethanol) and $[\alpha]_{365}^{25}+44.8°$ (ethanol).

*Analysis.*—Calcd. for $C_{16}H_{20}O_2$ (percent): C, 78.65; H, 8.25. Found (percent): C, 78.40; H, 8.27.

(B) (—)-5-cyclohexyl-1-indancarboxylic acid: The mother liquors from the salt formation in Part A were reduced to dryness and the residue treated with ether and 10% aqueous hydrochloric acid as previously described for the salt of the (+) isomer and from the ethereal layer was obtained a partially resolved mixture of acids (7.6 grams), enriched in the (—) isomer, $[\alpha]_D^{25}-7.69°$ (ethanol) and $[\alpha]_{365}^{25}-35.4°$ (ethanol).

This mixture was extracted with boiling petroleum ether (B.P. 39–50 C., 3×35 ml.) and the combined extracts were reduced in volume (50 ml.) and cooled in an ice bath. The crystalline solid (5.1 grams), M.P. 105–108° C., $[\alpha]_D^{25}-8.91°$ (ethanol) and $[\alpha]_{365}^{25}-41.5°$ (ethanol) was collected.

The solution of this acid (5.02 grams, 0.0205 mole) and dehydroabietylamine (5.85 grams, 0.0205 mole) in ethanol (500 ml.) was boiled down to a volume of about 175 ml. and cooled to 25° C. during two hours. The dehydroabietylamine salt of (—)-5-cyclohexyl-1-indancarboxylic acid (8.7 grams), M.P. 179–181° C., was collected and recrystallized from ethanol to give colorless crystals (8.0 grams), M.P. 184–185° C. The mother liquors from the product with M.P. 179–181° C., were reduced in volume and an additional crop of salt (0.95 gram), M.P., 178.5–180.5° C., was isolated. This latter material was recrystallized from ethanol and the product (0.78 gram), M.P. 182–183° C., was combined with the main crop. The dehydroabietylamine salt (8.78 grams) was partitioned between ether (400 ml.) and 10% aqueous hydrochloric acid. The ethereal solution was washed with water (3×150 ml.) followed by water saturated with sodium chloride (2×100 ml.), dried ($Na_2SO_4$), and reduced to dryness to leave the (—) isomer (4.0 grams). Recrystallization from petroleum ether (B.P. 39–50° C.) gave colorless needles (3.41 grams) of (—)-5-cyclohexyl-1-indancarzoxylic acid: M.P. 108–109.5° C., $[\alpha]_D^{25}-9.66°$ (ethanol) and $[\alpha]_{365}^{25}-44.7°$ (ethanol).

*Analysis.*—Calcd. for $C_{16}H_{20}O_2$ (percent): C, 78.65; H, 8.25. Found (percent): C, 78.85; H, 8.31.

A preferred embodiment of the present invention is the process for the preparation of compounds having the formula

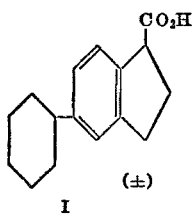

which process comprises the consecutive steps of (A) *treating* one mole of the compound having the formula

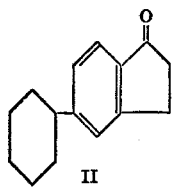

with at least one mole of a secondary amine selected from the group comprising morpholine, pyrrolidine, piperidine and N-methylpiperazine, in an inert solvent selected from the group comprising benzene, xylene and toluene, in the presence of a strong acid or titanium tetrachloride, with or without the aid of heat, to produce the compound having the formula

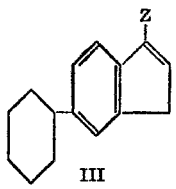

in which Z is a radical of the formula

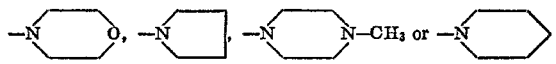

(B) *acylating* Compound III with at least an equimolar quantity of trichloroacetic acid to produce the compound having the formula

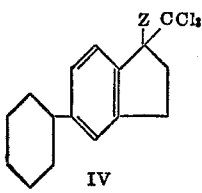

in which Z is as above;

(C) *refluxing* Compound IV in a (lower)alkanol to produce a mixture of compounds having the formula

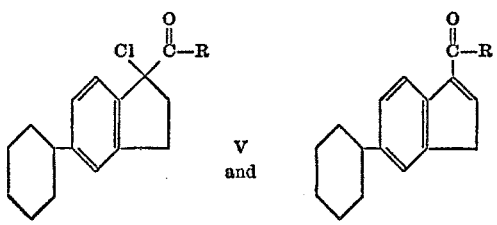

in which R is (lower)alkoxy or Z;

(D) *hydrogenating* Mixture V with hydrogen in the presence of a metal catalyst to produce a mixture of compounds having the formula

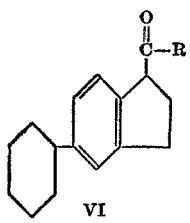

in which R is (lower)alkoxy or Z; and (E) *hydrolyzing* Compound VI.

A more preferred embodiment is the process for the preparation of compounds of Formula I which comprises the consecutive steps of (A) *treating* one mole of Compound II with 1.5 to 4 moles of a secondary amine selected from the group comprising morpholine, pyrrolidine, piperidine and N-methylpiperazine in benzene, toluene or xylene at about reflux temperature in the presence of a catalytic amount of benzenesulfonic, p-toluenesulfonic, concentrated sulfuric or concentrated phosphoric acid, azeotropically distilling off the water so generated to produce Compound III;

(B) *acylating* one mole of Compound III with about 1.0 to 1.2 moles of trichloroacetic acid in benzene, xylene or toluene at a temperature in the range of 30–50° C. to produce Compound IV;

(C) *refluxing* Compound IV in methanol, ethanol or n-propanol to produce Compounds V in which R is methoxy, ethoxy, n-propoxy or Z;

(D) *hydrogenating* Compound V with hydrogen in the presence of palladium, platinum, rhodium, Raney nickel or ruthenium, in a (lower)alkanol at a pressure of about 40 to about 200 p.s.i. until up to a maximum of one mole of hydrogen per mole of Compounds V is absorbed to produce Compounds VI in which R is methoxy, ethoxy, n-propoxy or Z; and (E) *hydrolyzing* Compound VI with an acid from the group comprising hydrochloric, sulfuric, nitric and phosphoric acid, or with a base selected from the group comprising sodium hydroxide and potassium hydroxide in a water containing solvent system.

A most preferred embodiment is the process for the preparation of compounds of Formula I which comprises the consecutive step of (A) *treating* one mole of Compound II with 1.8 to 2.2 moles of morpholine or pyrrolidine in anhydrous toluene at about reflux temperatures in the presence of a catalytic amount of p-toluenesulfonic acid, azeotropically distilling off the water so generated, to produce Compound III in which Z is

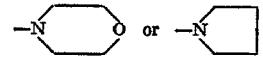

(B) *acylating* one mole of Compound III with about 1.0 mole of trichloroacetic acid in anhydrous benzene at a temperature in the range of 35–50° C. to produce Compound IV in which Z is as defined above;

(C) *refluxing* Compound IV in methanol for about 10 to 20 hours to produce Compounds V in which R is methoxy,

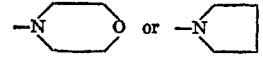

(D) *hydrogenating* Compound V in the presence of Raney nickel in methanol at a hydrogen pressure of 55–65 p.s.i. until up to a maximum of one mole of hydrogen per mole of Mixture V is absorbed to produce Compounds VI in which R is methoxy,

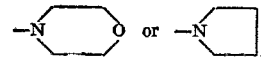

and (E) *hydrolyzing* Compounds VI with concentrated hydrochloric acid in glacial acetic acid at reflux temperatures for about 10 to about 20 hours.

A most preferred embodiment is the process for the preparation of compounds of Formula I which comprises the consecutive steps of (A) *treating* one mole of Compound II with 1.8 to 2.2 moles of morpholine in anhydrous toluene at about reflux temperatures in the presence of a catalytic amount of p-toluenesulfonic acid azeotropically distilling off the water so generated to produce Compound III in which Z is

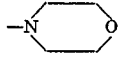

(B) *acylating* one mole of Compound III with about 1.0 mole of trichloroacetic acid in anhydrous benzene at a temperature in the range of 35–50° C. to produce Compound IV in which Z is as defined above;

(C) *refluxing* Compound IV in methanol for about 10 to 20 hours to produce Compounds V in which R is methoxy or

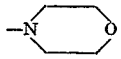

(D) *hydrogenating* Compound V in the presence of Raney nickel in methanol at a hydrogen pressure of 55–65 p.s.i. until up to a maximum of one mole of hydrogen per mole of Mixture V is absorbed to produce Compounds VI in which R is methoxy or

and (E) *hydrolyzing* Compounds VI with concentrated hydrochloric acid in glacial acetic acid at reflux temperatures for about 10 to about 20 hours.

A more preferred embodiment in the process for the preparation of compounds of Formula I which comprises the consecutive steps of (A) *treating* one mole of Compound II with 1.5 to 6 moles of a secondary amine selected from the group comprising morpholine, pyrrolidine, piperidine or N-methylpiperazine and 0.5 to 0.7 mole of titanium tetrachloride, in benzene, toluene or xylene, at about room temperature to produce Compound II in which Z is a radical of the formula

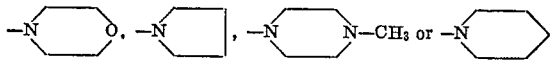

(B) *acylating* one mole of Compound III with about 1.0 to 1.2 moles of trichloroacetic acid in benzene, xylene or toluene at a temperature in the range of 30–50° C. to produce Compound IV in which Z is as defined above;

(C) *refluxing* Compound IV in methanol, ethanol or n-propanol to produce Compounds V in which R is methoxy, n-propoxy or Z;

(D) *hydrogenating* Compounds V with hydrogen in presence of palladium, platinum, rhodium, Raney nickel or ruthenium, in a (lower)alkanol at a pressure of about 40 to about 200 p.s.i. until up to a maximum of one mole of hydrogen per mole of Compounds V is absorbed to produce Compounds VI in which R is methoxy, ethoxy, n-propoxy or Z; and (E) *hydrolyzing* Compounds VI with an acid from the group comprising hydrochloric, sulfuric, nitric and phosphoric acid, or with a base selected from the group comprising sodium, hydroxide and potassium hydroxide in a water containing solvent system in a water containing solvent system in a water containing solvent system with the aid of heat.

A most preferred embodiment is the process for the preparation of compounds of Formula I which comprises the consecutive steps of (A) *treating* one mole of Compound II with about 3.5 to 4.5 moles of morpholine or pyrrolidine and about 0.55 to about 0.65 mole of titanium tetrachloride, in benzene, at about room temperature for about 10 to 20 hours to produce Compound III in which Z is

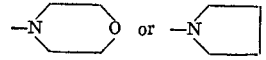

(B) *acylating* one mole of Compound III with about 1.0 mole of trichloroacetic acid in anhydrous benzene at a temperature in the range of 35–50° C. to produce Compound IV in which Z is as defined above;

(C) *refluxing* Compound IV in methanol for about 10 to 20 hours to produce Compounds V in which R is methoxy,

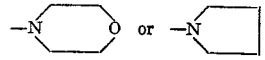

(D) *hydrogenating* Compounds V in the presence of Raney nickel in methanol at a hydrogen pressure of 55–65 p.s.i. until up to a maximum of one mole of hydrogen per mole of mixture V is absorbed to produce Compounds VI in which R is methoxy,

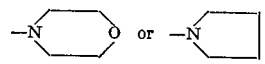

and (E) *hydrolyzing* Compounds VI with concentrated hydrochloric acid in glacial acetic acid at reflux temperatures for about 10 to about 20 hours.

A most preferred embodiment is the process for the preparation of compounds of Formula I which comprises the consecutive steps of (A) *treating* one mole of Compound II with about 3.5 to 4.5 moles of morpholine and about 0.55 to about 0.65 mole of titanium tetrachloride, in benzene, at about room temperature for about 10 to 20 hours to produce Compound III in which Z is

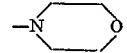

(B) *acylating* one mole of Compound III with about 1.0 mole of trichloroacetic acid in anhydrous benzene at a temperature in the range of 35–50° C. to produce Compound IV in which Z is as defined above;

(C) *refluxing* Compound IV in methanol for about 10 to 20 hours to produce Compounds V in which R is methoxy or

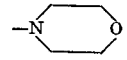

(D) *hydrogenating* Compounds V in the presence of Raney nickel in methanol at a hydrogen pressure of 55–65 p.s.i. until up to a maximum of one mole of hydrogen per mole of mixture V is absorbed to produce Compounds VI in which R is methoxy or

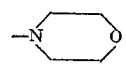

and (E) *hydrolyzing* Compounds VI with concentrated hydrochloric acid in glacial acetic acid at reflux temperatures for about 10 to about 20 hours.

For the purpose of this disclosure the terms "(lower)-alkanol" and "(lower) alkoxy" are moieties containing one to six carbon atoms, e.g., methanol-methoxy, ethanol-ethoxy, n-propanol-propoxy, isopropanol-isopropoxy, etc.

EXAMPLES OF THE PREFERRED EMBODIMENTS

EXAMPLE 1

5-cyclohexyl-1-indanone (II)

A solution of β-chloropropionyl chloride (13.3 g., 0.105 mole) and cyclohexylbenzene (16.0 g., 0.1 mole) in 10 ml. of s-tetrachloroethane was added dropwise with stirring over a period of 15 minutes to a cooled (ice-water) solution of anhydrous aluminum chloride (16.0 g., 0.12 mole) in 25 ml. of s-tetrachloroethane. The mixture was then stirred at room temperature for three hours. The resulting solution was transferred to an addition funnel and added dropwise with stirring to ice-cooled sulfuric acid (150 ml., sp. gr. 1.84). The mixture was then stirred on the steam-bath for 16 hours, poured onto ice (ca. 500 g.) and extracted with ether (3×300 ml.). The combined ether solution was washed with water (250 ml.), saturated aqueous sodium bicarbonate (200 ml.) and saturated aqueous sodium chloride (2×200 ml). The washed solution was dried over anhydrous sodium sulfate and concentrated in a rotary evaporator (bath at 80° C.) to give an oil. The oil was dissolved in boiling commercial petroleum-ether (B.P. 30–60° C.) and coloed in the ice-water to give 5-cyclohexyl-1-indanone (14.2 g.) as off-white crystals, M.P. 74–76° C. The infrared (IR) and nuclear magnetic resonance spectra (NMR) were consistent with the structure.

EXAMPLE 2

5-cyclohexyl-1-morpholinoind-1-ene (III)

In a 250 ml. flask equipped with a Dean-Stark trap and condenser, a mixture of 5-cyclohexyl-1-indanone (21.4 g., 0.1 mole), morpholine (17.4 g., 0.2 mole) and a few crystals of p-toluene-sulfonic acid (ca. 50 mg.) in Na-dried toluene (100 ml.), through which nitrogen was bubbled, was refluxed under nitrogen for 20 hours. The lower "aqueous layer" collected in the trap measured 2.6 ml. The solvent was removed in a rotary evaporator at about 85° C. and two additional portions (50 ml. each), of dry toluene were evaporated off. The residue was taken up in dry toluene (100 ml.), morpholine (17.4 g., 0.2 mole) was added along with a few crystals of p-toluenesulfonic acid and it was recycled for another 20 hours. An additional 1.6 ml. lower layer was collected. The solvent was once more removed on a rotary evaporator and after two additional 50 ml. portions of toluene had been evaporated off a red oil (28.45 g.) was obtained. The infrared spectrum showed a very weak carbonyl absorption. The IR and NMR were consistent with the structure.

EXAMPLE 3

5-cyclohexyl-1-morpholino-1-trichloromethyl-1-indan (IV)

The enamine product III (28.45 g.) was dissolved in Na-dried benzene (100 ml.) and to this solution with stirring was added a solution of trichloroacetic acid (16.3 g., 0.1 mole) in benzene (100 ml.). The reaction temperature was kept at 35–40° C. during the addition, which took two hours. Gas evolution started after about three to four minutes after addition of the acid commenced, continued regularly throughout the addition and for about 30 minutes after addition was complete. It was stirred at 35–40° C. for an additional 30 minutes after gas evolution ceased, then the solvent was removed in a rotary evaporator at a maximum of 50° C. (at higher temperatures a decomposition sets in and HCl gas can be detected). The weight of product was 40.3 g. The IR and NMR were consistent with the structure.

EXAMPLE 4

Preparation of Mixture V

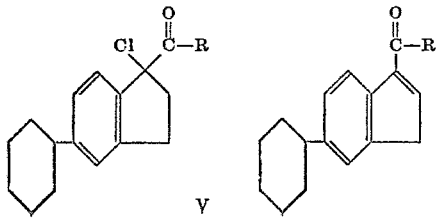

and
in which R is methoxy or

The trichloromethyl amino Compound IV (40.30 g.) was dissolved in industrial methanol (250 ml.) and refluxed with stirring for 16 hours. The solvent was removed in a rotary evaporator and the residue taken up in methylene chloride and water. The layers were separated and the organic layer was washed twice with water, dried over anhydrous sodium sulfate and evaporated to yield a red oil (27.62 g.). The NMR spectrum (as well as the infrared) indicated both amide and ester to be present in about a 1:1 ratio.

EXAMPLE 5

Preparation of Mixture VI

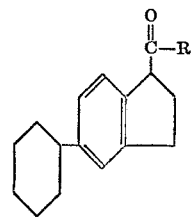

R is methoxy or

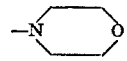

The amide/ester Mixture V (27.62 g.) was dissolved in absolute methanol (100 ml.) added to Raney nickel W-3 (about 10 teaspoonsful) and hydrogenated on a Parr apparatus at room temperature (≃25° C.) and initial pressure of 60 p.s.i. The uptake of hydrogen was very rapid at first, 75% (based on 0.1 mole) being consumed in 30 minutes. After two hours consumption had stopped with 0.095 mole of hydrogen having been consumed. It was filtered with suction and washed with hot methanol, being careful not to allow the nickel to be sucked dry. The solvent was removed on a rotary evaporator to yield a green oil (26.10 g.) which obviously contained nickel chloride. The oil was taken up in ether, washed with water, dried over anhydrous sodium sulfate and evaporated to give a red oil (21.03 g.). The IR and NMR were consistent with the mixture.

EXAMPLE 6

±-5-cyclohexyl-1-indancarboxylic acid (I)

The amide/ester Mixture II (21.03 g.) was dissolved in glacial acetic acid (200 ml.) and to this concentrate HCl (100 ml.) was added. The solution was refluxed with stirring for 16 hours at the end of which there was some oily material suspended on an otherwise clear, light yellow solution. On cooling to room temperature, shiny yellow crystals separated. It was filtered with suction, washed once with 50% acetic acid then several times with water, sucked "dry" in a stream of air and then in a vacuum desiccator overnight. This yielded 14.87 g. of a light yellow solid in which were embedded some dark material. The mother liquor was diluted with a large volume of water and on cooling and filtering an additional 2.53 g. of solid was obtained. Two recrystallizations from petroleum ether, (B.P. 66–75° C.), gave 11.70 g. light yellow crystals (first crop) M.P. 144.5–146° C. and 2.33 g. yellow crystals (second crop) M.P. 142–144° C. Combined and recrystallized once more from petroleum ether, it gave colorless crystals (12.32 g., 50.5%), M.P. 147–147.5° C. The IR and NMR were consistent with the product,

EXAMPLE 7

5-cyclohexyl-1-indanone morpholine enamine (III) (TiCl₄ method)

A solution of titanium tetrachloride (Baker 4167; 2.63 g., 1.52 ml., 0.0138 mole) in anhydrous benzene (50 ml.) was added dropwise with stirring over a period of 0.5 hour to a cooled (ice-water) solution of 5-cyclohexyl-1-indanone (5.35 g., 0.025 mole) and morpholine (MCB P–2923; 8.71 g., 8.7 ml., 0.10 mole) in anhydrous benzene (150 ml.). The mixture was then stirred at room temperature for 16 hours (all operations described above were carried out under an atmosphere of dry nitrogen), filtered, the filter cake washed with benzene, and the combined filtrates concentrated in a rotary evaporator. Toluene (25 ml.) was added and the solution concentrated again in a rotary evaporator to give a yellow solid (7.2 g.).

If desired the above solid can be recrystallized from pentane to give the pure enamine, M.P. 87–88.5° C. The crude product was used in the next step. The enamine should be used immediately; it becomes brownish on standing.

EXAMPLE 8

Preparation of (±)-5-cyclohexyl-1-indancarboxylic acid (I) via pyrrolidine enamine (A) 5-cyclohexyl-1-pyrrolidinoind - 1 - ene (IIIa).—In a 250 ml. flask equipped with a Dean-Stark trap and condenser, a mixture of 5-cyclohexyl-1-indanone (8.6 g., 0.04 mole) and pyrrolidine (7.1 g., 0.1 mole) in 25 ml. of benzene was refluxed for 18 hours. One equivalent of water was collected. The solution was taken to dryness in vacuo to yield the desired product IIIa as determined by IR and NMR spectral analysis.

(B) 5-cyclohexyl-1-pyrrolidino - 1 - trichloromethyl-1-indan (IVa).—The residue IIIa above was dissolved in 60 ml. of dry benzene and heated to 50–60° C. Chloroacetic acid (6.5 g., 0.04 mole) in 60 ml. of dry benzene was added over a one hour period. CO₂ evolution was apparent. After addition, the mixture was evaporated in vacuo to yield the title product IVa.

(C) Mixture Va.—The residue IVa was dissolved in 50 ml. of ethanol and refluxed about 14 hours. The solvent was removed in vacuo to yield the product Va as a colorless oil.

(D) Mixture VIa.—The colorless oil Va was dissolved in 100 ml. of methanol. Raney nickel (5 g.) was added and the mixture was hydrogenated at 60 p.s.i. till one equivalent of hydrogen was absorbed. The solution was filtered over celite and concentrated in vacuo to give an oil identified as product VIa by IR and NMR.

(E) ± - 5 - cyclohexyl - 1 - indancarboxylic acid.—The oil VIa was dissolved in 25 ml. of ethanol and 25 ml. of 25% sodium hydroxide and refluxed for one hour. The solution was concentrated in vacuo, diluted with water, washed with ether and acidified with dilute hydrochloric acid. The cloudy mixture was extracted with chloroform, dried over anhydrous sodium sulfate, evaporated in vacuo and crystallized from petroleum ether, B.P. 66–75° C. to yield the desired product I, M.P. 147–147.5° C.

We claim:

1. The process for the preparation of compounds having the formula

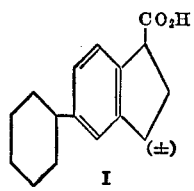

which process comprises the consecutive steps of
(A) *treating* one mole of the compound having the formula

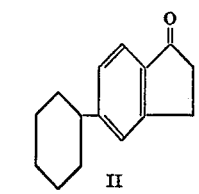

with at least one mole of a secondary amine selected from the group comprising morpholine, pyrrolidine, piperidine and N-methylpiperazine, in an inert solvent selected from the group comprising benzene, xylene and toluene in the presence of a strong acid or titanium tetrachloride, with or without the aid of heat, to produce the compound having the formula

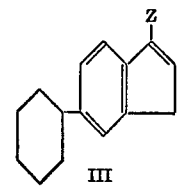

in which Z is a radical of the formula

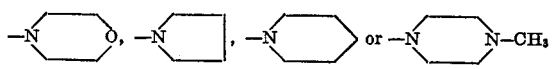

(B) *acylating* one mole of Compound III with at least an equimolar quantity of trichloroacetic acid to produce the compound having the formula

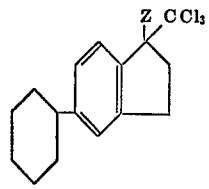

in which Z is as defined above;

(C) *refluxing* Compound IV in a (lower)alkanol to produce a mixture of compounds having the Formulae V

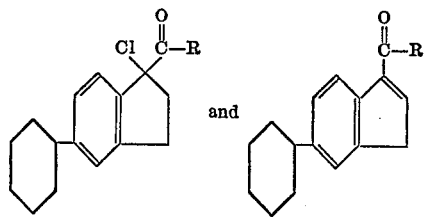

in which R is (lower)alkoxy or Z;

(D) *hydrogenating* Mixture V with hydrogen in the presence of a metal catalyst selected from the group comprising palladium, platinum, rhodium, nickel, Raney nickel and ruthenium to produce a mixture of compounds having the formula

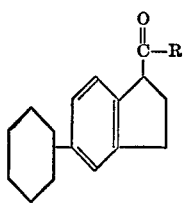

in which R is (lower)alkoxy or Z; and (E) *hydrolyzing* Compound VI.

2. The process of claim 1 which comprises the consecutive steps of
(A) *treating* one mole of Compound II with 1.5 to 4 moles of a secondary amine selected from the group comprising morpholine, pyrrolidine, piperidine and N-methylpiperazine in benzene, toluene or xylene, at about reflux temperature, in the presence of a catalytic amount of benzenesulfonic, p-toluenesulfonic, concentrated sulfuric or concentrated phosphoric acid, azeotropically distilling off the water so generated to produce Compound III;

(B) *acylating* one mole of Compound III with about 1.0 to 1.2 moles of trichloroacetic acid in benzene, xylene or toluene, at a temperature in the range of 30–35° C., to produce Compound IV;

(C) *refluxing* Compound IV in methanol, ethanol or n-propanol to produce Compound V in which R is methoxy, ethoxy, n-propoxy or Z;

(D) *hydrogenating* Compounds V with hydrogen in the presence of palladium, platinum, rhodium, Raney nickel or ruthenium, in a (lower)alkanol at a pressure of about 40 to about 200 p.s.i. until up to a maximum of one mole of hydrogen per mole of Compounds V is absorbed to produce Compounds VI in which R is methoxy, ethoxy, n-propoxy or Z; and (E) *hydrolyzing* Compounds VI with an acid from the group comprising hydrochloric, sulfuric, nitric and phosphoric acid, or with a base selected from the group comprising sodium hydroxide and potassium hydroxide in a water containing solvent system with the aid of heat.

3. The process of claim 1 which comprises the consecutive steps of (A) *treating* one mole of Compound II with 1.8 to 2.2 moles of pyrrolidine or morpholine in anhydrous toluene, at about reflux temperatures, in the presence of a catalytic amount of p-toluenesulfonic acid, azeotropically distilling off the water so generated, to produce Compound III in which Z is

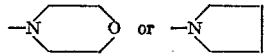

(B) *acylating* one mole of Compound III with about 1.0 mole of trichloroacetic acid in anhydrous benzene at a temperature in the range of 35–50° C. to produce Compound IV in which Z is

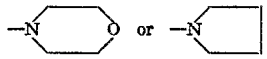

(C) *refluxing* Compound IV in methanol for about 10 to 20 hours to produce Compounds V in which R is methoxy,

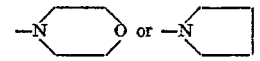

(D) *hydrogenating* Compounds V in the presence of Raney nickel, in methanol, at a hydrogen pressure of 55 to 65 p.s.i. until up to a maximum of one mole of hydrogen per mole of a Mixture V is absorbed to produce Compounds VI in which R is methoxy,

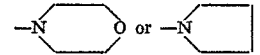

and (E) *hydrolyzing* Compounds VI with concentrated hydrochloric acid in glacial acetic acid at reflux temperatures for about 10 to about 20 hours.

4. The process of claim 1 which comprises the consecutive steps of (A) *treating* one mole of Compound II with 1.8 to 2.2 moles of morpholine in anhydrous toluene at about reflux temperatures in the presence of a catalytic amount of p-toluenesulfonic acid, azeotropically distilling off the water so generated, to produce Compound III in which Z is

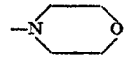

(B) *acylating* one mole of Compound III with about 1.0 mole of trichloroacetic acid in anhydrous benzene at a temperature in the range of 35–50° C. to produce Compound IV in which Z is as defined above;

(C) *refluxing* Compound IV in methanol for about 10 to 20 hours to produce Compounds V in which R is methoxy or

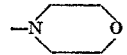

(D) *hydrogenaitng* Compound V in the presence of Raney nickel in methanol at a hydrogen pressure of 55–65 p.s.i. until up to a maximum of one mole of hydrogen per mole of Mixture V is absorbed to produce Compounds VI in which R is methoxy or

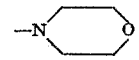

and (E) *hydrolyzing* Compound VI with concentrated hydrochloric acid in glacial acetic acid at reflux temperatures for about 10 to about 20 hours.

5. The process of claim 1 which comprises the consecutive steps of (A) *treating* one mole of Compound II with 1.5 to 6 moles of a secondary amines selected from the group comprising morpholine, piperidine, pyrrolidine and N-methylpiperazine, and 0.5 to 0.7 mole of titanium tetrachloride, in benzene, toluene or xylene, at about room temperature to produce Compound III in which Z is a radical of the formula

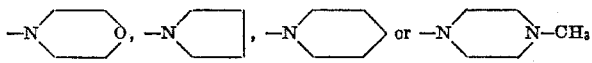

(B) *acylating* one mole of Compound III with about 1.0 to 1.2 moles of trichloroacetic acid in benzene, xylene or toluene at a temperature in the range of 30–50° C. to produce Compound IV in which Z is defined as above;

(C) *refluxing* Compound IV in methanol, ethanol or n-propanol to produce Compound V in which R is methoxy, ethoxy, n-propoxy or Z;

(D) *hydrogenating* Compounds V with hydrogen in the presence of palladium, platinum, rhodium, Raney nickel or ruthenium, in a (lower)alkanol at a pressure of about 40 to about 200 p.s.i. until up to a maximum of one mole of hydrogen per mole of Compounds V is absorbed to produce Compounds VI in which R is methoxy, ethoxy, n-propoxy or Z; and (E) *hydrolyzing* Compounds VI with an acid from the group comprising hydrochloric, sulfuric, nitric and phosphoric acid, or with a base selected from the group comprising sodium hydroxide and potassium hydroxide in a water containing solvent system with the aid of heat.

6. The process of claim 1 which comprises the consecutive steps of (A) *treating* one mole of Compound II with about 3.5 to 4.5 moles of morpholine or pyrrolidine and about 0.55 to about 0.65 mole of titanium tetrachloride, in benzene, at about room temperature for about 10 to 20 hours to produce Compound III in which Z is

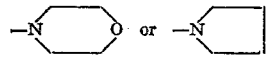

(B) *acylating* one mole of Compound III with about 1.0 mole of trichloroacetic acid, in anhydrous benzene, at a temperature in the range of 35–50° C. to produce Compound IV in which Z is as defined above;

(C) *refluxing* Compound IV in methanol for about 10 to 20 hours to produce Compounds V in which R is methoxy,

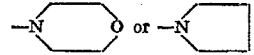

(D) *hydrogenating* Compounds V in the presence of Raney nickel, in methanol, at a hydrogen pressure of 55 to 65 p.s.i. until up to a maximum of one mole of hydrogen per mole of mixture V is absorbed to produce Compounds VI in which R is methoxy,

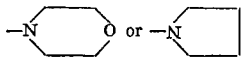

and (E) *hydrolyzing* Compounds VI with concentrated hydrochloric acid in glacial acetic acid at reflux temperatures for about 10 to about 20 hours.

7. The process of claim 1 which comprises the consecutive steps of (A) *treating* one mole of Compound II with about 3.5 to 4.5 moles of morpholine and about 0.55 to about 0.65 mole of titanium tetrachloride, in benzene, at about room temperature for about 10 to 20 hours to produce Compound III in which Z is

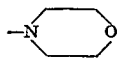

(B) *acylating* one mole of Compound III with about 1.0 mole of trichloroacetic acid in anhydrous benzene at a temperature in the range of 35–50° C. to produce Compound IV in which Z is as defined above;

(C) *refluxing* Compound IV in methanol for about 10 to 20 hours to produce Compounds V in which R is methoxy or

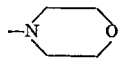

(D) hydrogenating Compounds V in the presence of Raney nickel in methanol at a hydrogen pressure of 55–65 p.s.i. until up to a maximum of one mole of hydrogen per mole of Mixture V is absorbed to produce Compounds VI in which R is methoxy or

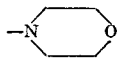

and (E) *hydrolyzing* Compounds VI with concentrated hydrochloric acid in glacial acetic acid at reflux temperatures for about 10 to about 20 hours.

References Cited

Lukasiewicz et al., Tetrahedron, vol. 21 (1965), pp. 3247–53.

Lukasiewicz et al., Tetrahedron, vol. 24 (1968), pp. 7–11.

JAMES A. PATTEN, Primary Examiner

U.S. Cl. X.R.

260—247, 247.7 H, 268 R, 268 C, 293.62, 326.5 B, 469